(12) United States Patent
Lee (10) Patent No.: US 11,914,356 B2
(45) Date of Patent: Feb. 27, 2024

(54) INTEGRITY INDEX DETECTING METHOD FOR DEVICE BY MEANS OF CONTROL OUTPUT SIGNAL

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 183 days.

(21) Appl. No.: 17/558,976

(22) Filed: Dec. 22, 2021

(65) Prior Publication Data

US 2022/0113714 A1    Apr. 14, 2022

Related U.S. Application Data

(63) Continuation of application No. PCT/KR2020/007278, filed on Apr. 6, 2020.

(30) Foreign Application Priority Data

Jun. 25, 2019 (KR) .......................... 10-2019-0075804

(51) Int. Cl.
G05B 23/02 (2006.01)
(52) U.S. Cl.
CPC ..... *G05B 23/0221* (2013.01); *G05B 23/0237* (2013.01)

(58) Field of Classification Search
CPC .......................... G05B 23/0221; G05B 23/0237
See application file for complete search history.

(56) References Cited

FOREIGN PATENT DOCUMENTS

| KR | 10-1095598 | | 12/2011 |
|---|---|---|---|
| KR | 10-1643599 | | 7/2016 |
| KR | 101643599 | B1 * | 7/2016 |
| KR | 10-1894697 | | 9/2018 |
| KR | 10-2019-0030763 | | 3/2019 |
| KR | 10-1981310 | | 5/2019 |

\* cited by examiner

*Primary Examiner* — Nabil H Syed
(74) *Attorney, Agent, or Firm* — NKL Law; Byungwoong Park

(57) ABSTRACT

The present invention relates to an integrity index detecting method for a device by means of a control output signal which, after establishing an integrity index reference table based on an integrity reference value set based on information collected from a normal device and a defect reference value set based on information collected from a device before a malfunction occurs, outputs an integrity index value indicating an integrity of the device in real time by applying a gradient value with respect to a time interval value between control output signals collected from the device in real time to the integrity index reference table to provide the integrity index value to a manager.

4 Claims, 9 Drawing Sheets

INTEGRITY INDEX DETECTING METHOD FOR DEVICE BY MEANS OF CONTROL OUTPUT SIGNAL

CROSS-REFERENCE TO RELATED APPLICATIONS

The present application is a bypass continuation application of currently pending international application No. PCT/KR2020/007278 having an international filing date of Jun. 4, 2020 and designating the United States, the international application claiming a priority date of Jun. 25, 2019 based upon prior filed K.R patent application No. 10-2019-0075804, the entire contents of the aforesaid international application and the aforesaid K.R. patent application being incorporated herein by reference.

BACKGROUND

The present invention relates to an integrity index detecting method for a device by means of a control output signal, and more particularly, to an integrity index detecting method for a device by means of a control output signal which, after establishing an integrity index reference table based on an integrity reference value set based on information collected from a normal device and a defect reference value set based on information collected from a device before a malfunction occurs, outputs an integrity index value indicating an integrity of the device in real time by applying a gradient value with respect to a time interval value between control output signals collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Generally, an stable operation is very important for various devices used for an automation process of equipment.

For example, dozens or hundreds of devices are installed in the equipment of large-scale production plants to continuously produce products while interlocking with each other. If any one of the plurality of devices is broken, a tremendous situation in which the entire operation of the equipment is stopped may occur.

In this case, due to the down-time caused by the malfunction of the device, a huge loss may be caused by not only the repair cost of the device, but also the operating cost which is wasted while the equipment is stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

In order to avoid an unexpected down-time cost, there is an urgent need for a method of providing information about a real-time state of the device to the manager to induce efficient management of the device by performing the inspection and the repair in advance before the malfunction of the device occurs.

SUMMARY OF INVENTION

The present invention is proposed to solve various problems described above and an object is to provide an integrity index detecting method for a device by means of a control output signal which after establishing an integrity index reference table based on an integrity reference value set based on information collected from a normal device and a defect reference value set based on information collected from a device before a malfunction occurs, outputs an integrity index value indicating an integrity of the device in real time by applying a gradient value with respect to a time interval value between control output signals collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, an object of the present invention is to provide an integrity index detecting method for a device by means of a control output signal which not only very precisely detects an integrity of the device, but also ensures an excellent reliability for the detected integrity of the device by presenting various detecting conditions for searching for an integrity in the device and detecting the integrity of the device based on the detecting conditions.

In order to achieve the above-described objects, an integrity index detecting method for a device by means of a control output signal according to the present invention includes an integrity information collecting step S10 of collecting a time interval value between a control output signal and another control output signal which are output from a controller in a normal state of the device which receives at least one control output signal output from the controller to repeatedly operate, in which the time interval value between the control output signal and another control output signal which are output from the controller to allow the device to repeat an operation is repeatedly collected and gradient information for the time interval value between the control output signals is collected by means of a gradient of a straight line connecting the collected time interval values; a defect information collecting step S20 of collecting a time interval value between a control output signal and another control output signal which are output from the controller in a state before malfunction of the device which receives at least one control output signal output from the controller to repeatedly operate occurs, in which the time interval value between the control output signal and another control output signal which are output from the controller to allow the device to repeat an operation is repeatedly collected and gradient information for the time interval value between the control output signals is collected by means of a gradient of a straight line connecting the collected time interval values; a setting step S30 of setting an integrity reference value and a defect reference value for the gradient of the time interval value between the control output signals based on the gradient information for the time interval value between the control output signals collected in the integrity and defect information collecting steps S10 and S20; a detecting step S40 of repeatedly measuring and detecting the time interval value between a control output signal and another control output signal which are output from the controller to repeatedly perform an operation of the device in real time and detecting the integrity index value of the device by comparing the integrity and defect reference values set in the setting step S30 with a gradient value for the collected time interval value; and an outputting step S50 of outputting the integrity index value detected in the detecting step S40 to provide the integrity index value to the manager.

Further, the detecting step S40 includes: a partitioning procedure S41 of partitioning a section between the integrity reference value and the defect reference value for the gradient of the time interval value between the control output signals set in the setting step S30 into at least two sections; a setting procedure S42 of setting a section partitioned between the integrity reference value and the defect reference value to a first section, a second section, . . . , and an n-th section sequentially from the integrity reference value and establishing the integrity index reference table by setting an integrity index value for each section; and a detecting procedure S43 of applying the gradient value for the time interval value between the control output signals measured and collected in the device in real time to the integrity index reference table to detect a section corresponding to the gradient value for the measured time interval value and extract the integrity index value of the detected section.

Further, in the setting step S30, an average detection section of predetermined unit time intervals including two or more gradient values for the time interval value between the control output signals transmitted to the device is set.

In the detecting procedure S43 of the detecting step S40, the gradient value for the time interval value between the control output signals transmitted to the device during the average detection section in real time is collected to apply the average gradient value to the integrity index reference table to detect the integrity index value of the device.

According to the present invention, after establishing an integrity index reference table based on an integrity reference value set based on information collected from a normal device and a defect reference value set based on information collected from a device before a malfunction occurs, an integrity index detecting method for a device by means of a control output signal outputs an integrity index value indicating an integrity of the device in real time by applying a gradient value with respect to a time interval value between control output signals collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, an integrity index detecting method for a device by means of a control output signal not only very precisely detects an integrity of the device, but also ensures an excellent reliability for the detected integrity of the device by presenting various detecting conditions for searching for an integrity in the device and detecting the integrity of the device based on the detecting conditions.

The technology to be described below may be modified in various forms and has various exemplary embodiments, and thus specific exemplary embodiments will be illustrated in the drawings and described in detail in detailed description. However, this does not limit the technology to be described below within the specific exemplary embodiments, and it should be understood that the present invention covers all the modifications, equivalents and replacements within the technical spirit and technical scope to be described below.

Terms such as first, second, A, or B may be used to describe various components but the components are not limited by the above terms and are used only to distinguish one component from the other component. For example, without departing from the scope of the technology to be described below, a first component may be referred to as a second component, and similarly, a second component may be referred to as a first component. A term of and/or includes a combination of a plurality of related elements or any one of the plurality of related elements. For example, "A and/or B" may be interpreted as "at least one of A and B".

Unless the context apparently indicates otherwise, it should be understood that the singular expression includes plural expression. Further, it should be understood that terms "include" indicate that a feature, a number, a step, an operation, a component, a part or the combination those of described in the specification is present, but do not exclude a possibility of presence or addition of one or more other features, numbers, steps, operations, components, parts or combinations thereof.

Prior to a detailed description for the drawings, it is intended to clarify that the components in the present specification are merely classified according to a main function of each component. That is, two or more components to be described below may be combined as one component or one component may be divided into two or more components for every subdivided function. Further, each component to be described below may further perform a part or all of the function which is performed by the other component, as well as a main function to be performed by itself and a partial function of the main function of each component may be exclusively performed by the other component.

When a method or an operating method is performed, processes which constitute the method may be performed in a different order from the mentioned order unless a specific order is clearly mentioned in context. That is, the processes may be performed in the order as described or simultaneously, or an opposite order.

DETAILED DESCRIPTION

An integrity index detecting method for a device by means of a control output signal according to a preferred exemplary embodiment of the present invention will be described in detail based on the accompanying drawings. A detailed description of known functions and configurations determined to unnecessarily obscure the gist of the present invention will be omitted.

Figure 1:
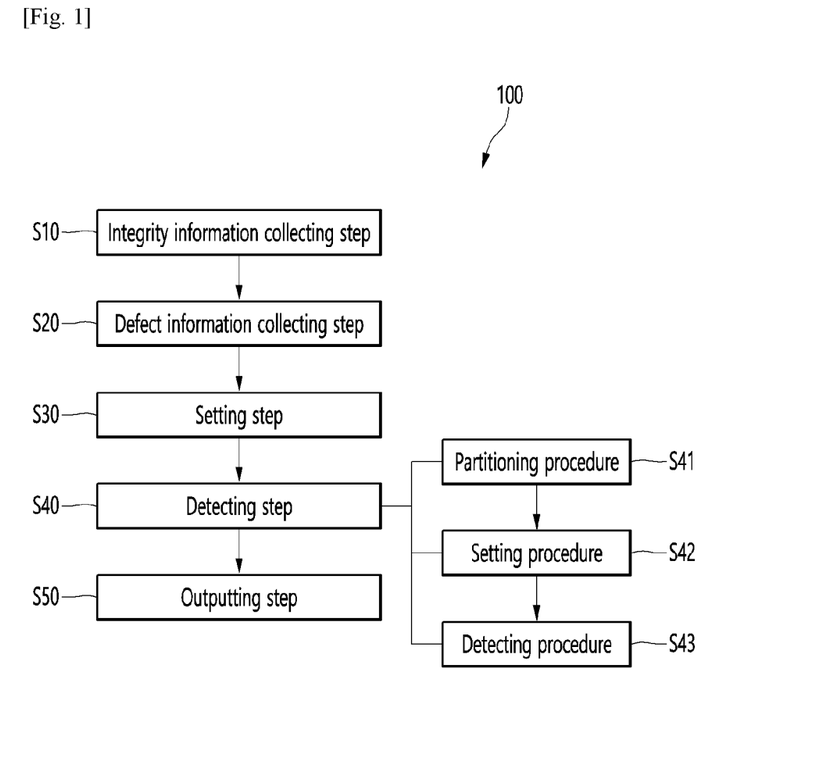
FIG. 1 is a flowchart of an integrity index detecting method for a device by means of a control output signal according to an exemplary embodiment of the present invention.

FIG. 1 is a flowchart of an integrity index detecting method for a device by means of a control output signal according to an exemplary embodiment of the present invention.

As illustrated in FIG. 1, the integrity index detecting method 100 for a device by means of a control output signal according to an exemplary embodiment of the present invention includes an integrity information collecting step S10, a defect information collecting step S20, a setting step S30, a detecting step S40, and an output step S50.

Figure 2:
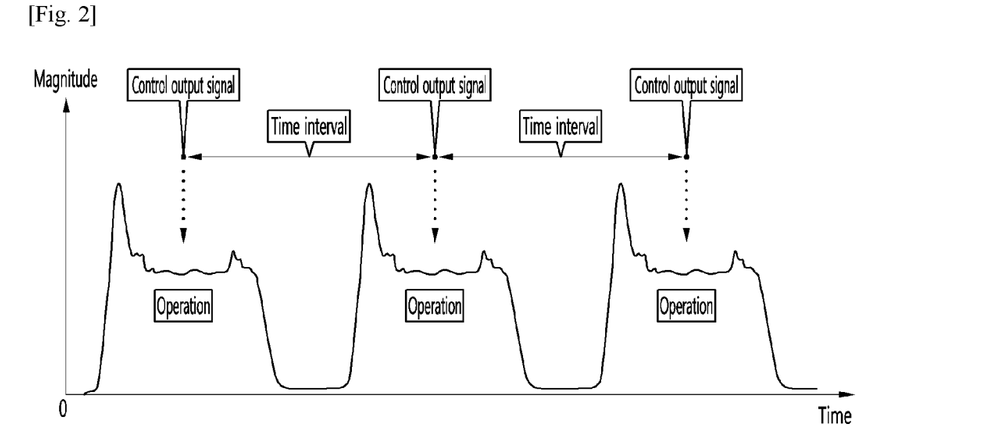
FIG. 2 illustrates an integrity information collecting step according to a first exemplary embodiment of the present invention.

FIG. 2 illustrates an integrity information collecting step according to a first exemplary embodiment of the present invention.

The integrity information collecting step S10 is a step of collecting a time interval value between a control output signal and another control output signal which are output from a controller in a normal state of the device which receives at least one control output signal output from the controller to repeatedly operate in which the time interval value between the control output signal and another control output signal which are output from the controller to allow the device to repeat an operation is repeatedly collected and gradient information for the time interval value between the control output signals is collected by means of a gradient of a straight line connecting the collected time interval values.

Generally, in order to perform an operation by the device, the device may operate by receiving one control output signal from the controller or operate by receiving a plurality of control output signals. For example, as illustrated in FIG. 2, the time interval value between the control output signals of the device which performs one operation based on one control output signal is defined as a time interval value between a control output signal transmitted to perform one operation and a control output signal transmitted to perform a repetitive subsequent operation so that in the integrity information collecting step S10, a gradient value (information) for the defined time interval value may be repeatedly collected.

Here, FIG. 2 illustrates an example of a drilling machine in a normal state which repeatedly performs an operation of continuously drilling holes by receiving a control output signal output from the controller and a waveform illustrated in FIG. 2 illustrates an energy (power) value consumed during the process of performing an operation by the device over time.

Figure 3:
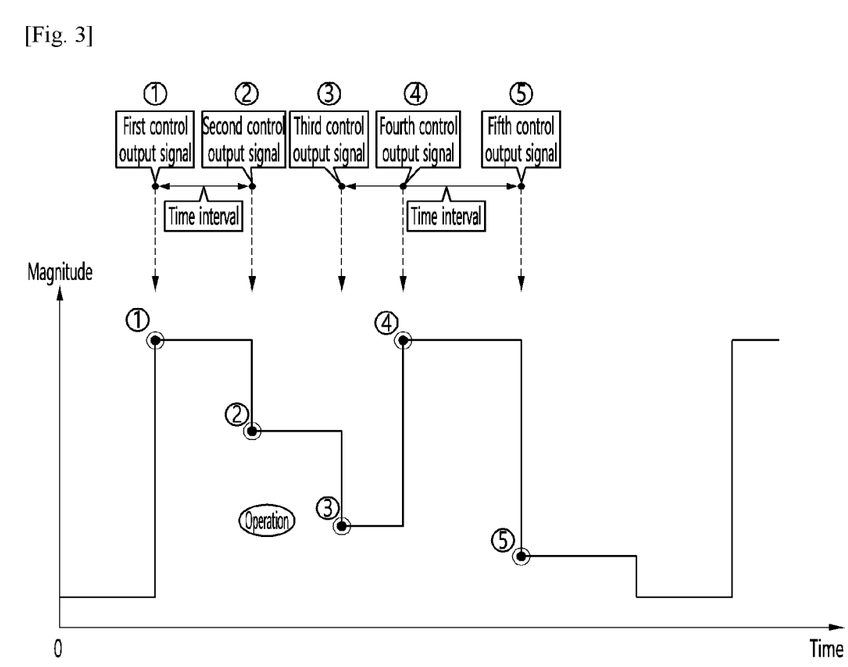
FIG. 3 illustrates an integrity information collecting step according to a second exemplary embodiment of the present invention.

FIG. 3 illustrates an integrity information collecting step according to a second exemplary embodiment of the present invention.

As another example, the time interval value between the control output signals of the device which performs one operation based on the plurality of control output signals may be collected by being defined as at least one time interval value between specific control output signals selected from the plurality of control output signals. As illustrated in FIG. 3, for example, in the device which receives five output control signals to perform one operation, five control output signals are assumed sequentially as a first control output signal, . . . , a fifth control output signal and a time interval value between selected specific control output signals, for example, a time interval value between the first control output signal and a second control output signal, and a time interval value between the third control output signal and the fifth control output signal may be set to be established and the gradient information for the time interval value may be collected.

In the integrity index detecting method 100 for a device by means of a control output signal of the present invention, for the convenience of description, the time interval value between the control output signals is repeatedly collected based on a device which performs one operation based on one control output signal and the gradient information for the collected time interval value is detected and collected as described below.

Figure 4:
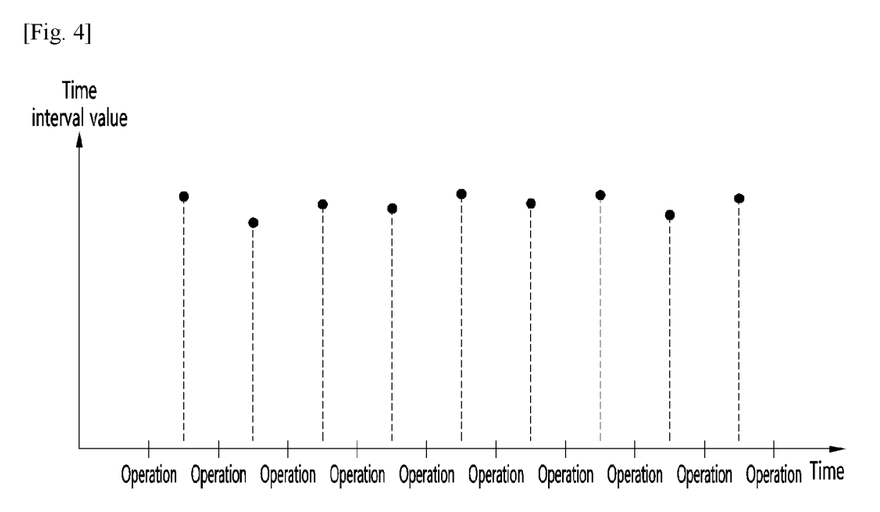
FIG. 4 is a graph illustrating a time interval value between control output signals collected in FIG. 2 over time.
Figure 5:
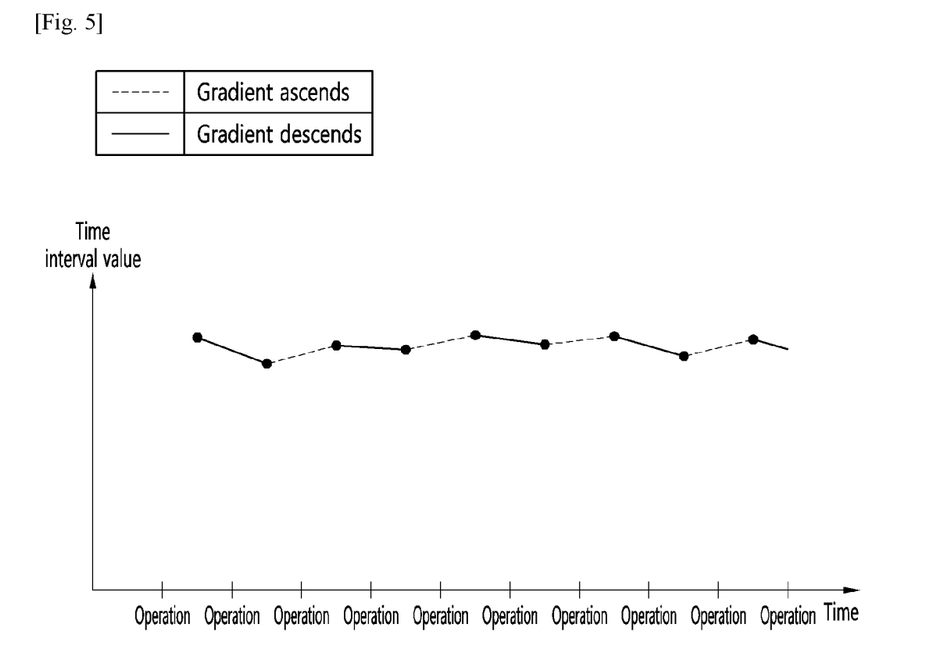
FIG. 5 is a view illustrating a graph obtained by connecting a time interval value illustrated in FIG. 4.

FIG. 4 is a graph illustrating a time interval value between control output signals collected in FIG. 2 over time and FIG. 5 is a view illustrating a graph obtained by connecting a time interval value illustrated in FIG. 4.

Referring to FIGS. 4 and 5, in FIG. 4, a predetermined gradient value may be acquired by a gradient of a straight line connecting the time interval values. As illustrated in FIG. 5, even though the gradient value may be divided into an ascending gradient value (positive) at which the gradient ascends and a descending gradient value (negative) at which the gradient descends, all the gradient values are represented as absolute values and collected.

As described above, the gradient information for the time interval value of the device collected and extracted in the integrity information collecting step S10 becomes a basis of an integrity reference value set to detect the integrity of the device in the setting step S30 to be described below.

The defect information collecting step S20 is a step of collecting a time interval value between a control output signal and another control output signal which are output from a controller in a state before malfunction of the device which receives at least one control output signal output from the controller to repeatedly operate occurs in which the time interval value between the control output signal and another control output signal which are output from the controller to allow the device to repeat an operation is repeatedly collected and gradient information for the time interval value between the control output signals is collected by means of a gradient of a straight line connecting the collected time interval values.

Here, the gradient information for the time interval value between the control output signals measured and collected in the defect information collecting step S20 becomes a basis of a defect reference value set to detect the integrity of the device in the setting step S30.

The setting step S30 is a step of setting an integrity reference value and a defect reference value for the gradient of the time interval value between the control output signals based on the gradient information for the time interval value between the control output signals collected in the integrity and defect information collecting steps S10 and S20.

Here, the integrity reference value is set based on the gradient information for the time interval value between the control output signals collected in the integrity information collecting step S10, and the defect reference value is set based on a gradient value of the time interval values which abnormally change (increase) before the malfunction of the device occurs based on the gradient information for the time interval value between the control output signals collected in the defect information collecting step S20.

In the detecting step S40, the time interval value between a control output signal and another control output signal which are output from the controller to repeatedly perform an operation of the device in real time is repeatedly measured and collected, and the integrity index value of the device is detected by comparing the integrity and defect reference values set in the setting step S30 with a gradient value for the collected time interval value. The detecting step is configured by a partitioning procedure S41, a setting procedure S42, and a detecting procedure S43.

Figure 6:
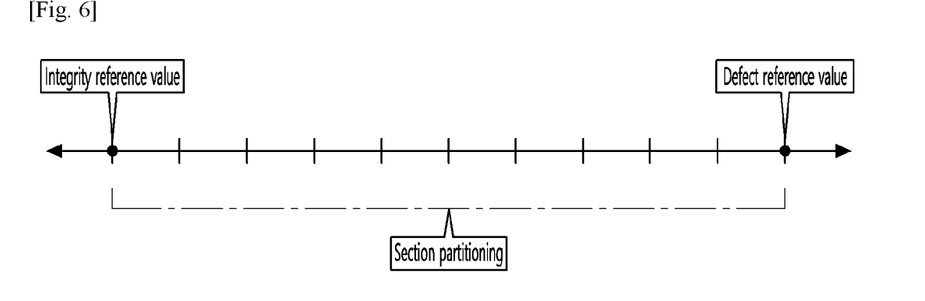
FIG. 6 is a view illustrating a partitioning procedure according to an exemplary embodiment of the present invention.

FIG. 6 is a view illustrating a partitioning step according to an exemplary embodiment of the present invention.

The partitioning procedure S41 is a procedure of partitioning a section between the integrity reference value and the defect reference value for the gradient of the time interval value between the control output signals set in the setting step S30 into at least two sections.

As illustrated in FIG. 6, there is a (magnitude) difference between the integrity reference value and the defect reference value and a section between the integrity reference value and the defect reference value is formed by the difference and this section is partitioned into two or more sections with the same interval.

Here, when the section between the integrity reference value and the defect reference value is partitioned, the number of times of partitioning of the section is set depending on how precisely detect the integrity of the device in the detecting procedure S43 to be described below. For example, as compared with the partitioning between the integrity reference value and the defect reference value into 10 sections, when the section between the integrity reference value and the defect reference value is partitioned into 100 sections, the integrity of the device may be more precisely detected.

In the integrity index detecting method 100 for a device by means of the control output signal of the present invention, the section between the integrity reference value and the defect reference value is partitioned into 10 sections, but the number of partitioned sections is not limited thereto.

Figure 7:
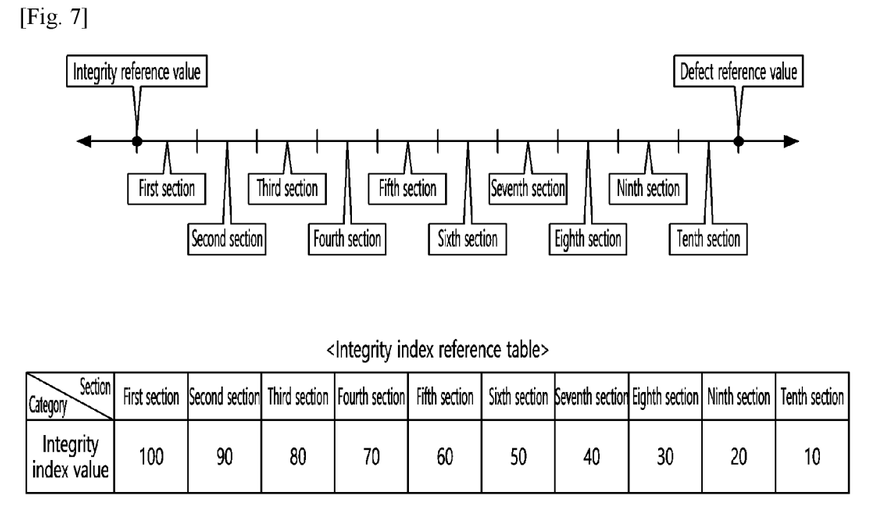
FIG. 7 is a view illustrating a setting procedure according to an exemplary embodiment of the present invention.

FIG. 7 is a view illustrating a setting procedure according to an exemplary embodiment of the present invention.

The setting procedure S42 is a procedure of setting a section partitioned between the integrity reference value and the defect reference value to a first section, a second section, . . . , and an n-th section sequentially from the integrity reference value and establishing the integrity index reference table by setting an integrity index value for each section.

Referring to FIG. 7, in the partitioning procedure S41, when the section between the integrity reference value and the defect reference value is partitioned into 10 sections, the partitioned sections are set as a first section, a second section, . . . , and a tenth section from the integrity reference value and then an integrity index value for each section is set to establish the integrity index reference table. In the integrity index detecting method 100 for a device by means of a control output signal of the present invention, the integrity index value is limited to the range from minimum 10 to maximum 100, the limited integrity index value is assigned to each section to detect the integrity of the device.

Here, the integrity index value is limited to the range of 10 to 100 and when a value of the integrity index is large, a state of the device is set to be sound and when the value of the integrity index is small, the state of the device is set to be defective. The limiting and setting of the range of the integrity index value are arbitrarily determined as an example and the integrity index value may be determined to various ranges and settings.

Figure 8:
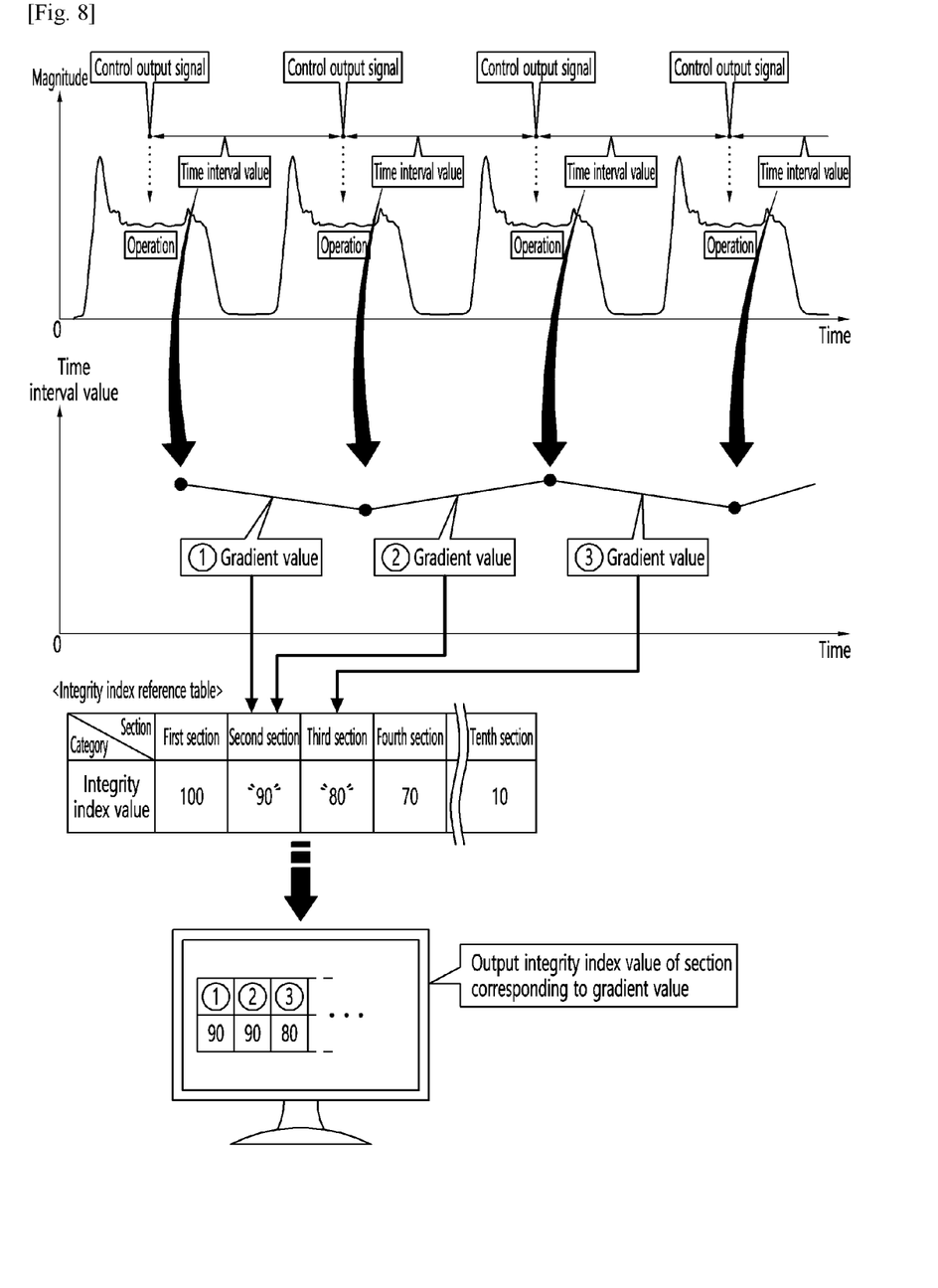
FIG. 8 is a view illustrating a detecting procedure according to an exemplary embodiment of the present invention.

FIG. 8 is a view illustrating a detecting procedure according to an exemplary embodiment of the present invention.

The detecting procedure S43 is a procedure of applying the gradient value for the time interval value between the control output signals measured and collected in the device in real time to the integrity index reference table to detect a section corresponding to the gradient value for the measured time interval value and extract the integrity index value of the detected section.

Referring to FIG. 8, the gradient value for the time interval value between the control output signals output from the controller to control an operation of the device in real time is measured and collected, a corresponding section is detected by applying the measured gradient value for the time interval value to the integrity index reference table and the integrity index value corresponding to the detected section is extracted (acquired).

The outputting step S50 is a step of outputting the integrity index value detected in the detecting step S40 to provide the integrity index value to the manager.

That is, when the integrity index value of the device is extracted in real time through the procedures of the detecting step S40, the extracted integrity index value is output to a normal monitor as an image to induce the manager to clearly recognize the integrity state of the device to effectively handle (inspect/repair) according to the integrity of the device.

In the meantime, in the setting step S30, an average detection section of predetermined unit time intervals including two or more gradient values for the time interval value between the control output signals transmitted to the device is set.

In the detecting procedure S43 of the detecting step S40, the gradient value for the time interval value between the control output signals transmitted to the device during the average detection section in real time is collected to apply the averaged average gradient value to the integrity index reference value table to detect the integrity index value of the device.

For example, a procedure of setting a predetermined unit time and detecting the integrity index of the device based on the gradient value for the time interval value between the control output signals included in the set unit time will be described.

Figure 9:
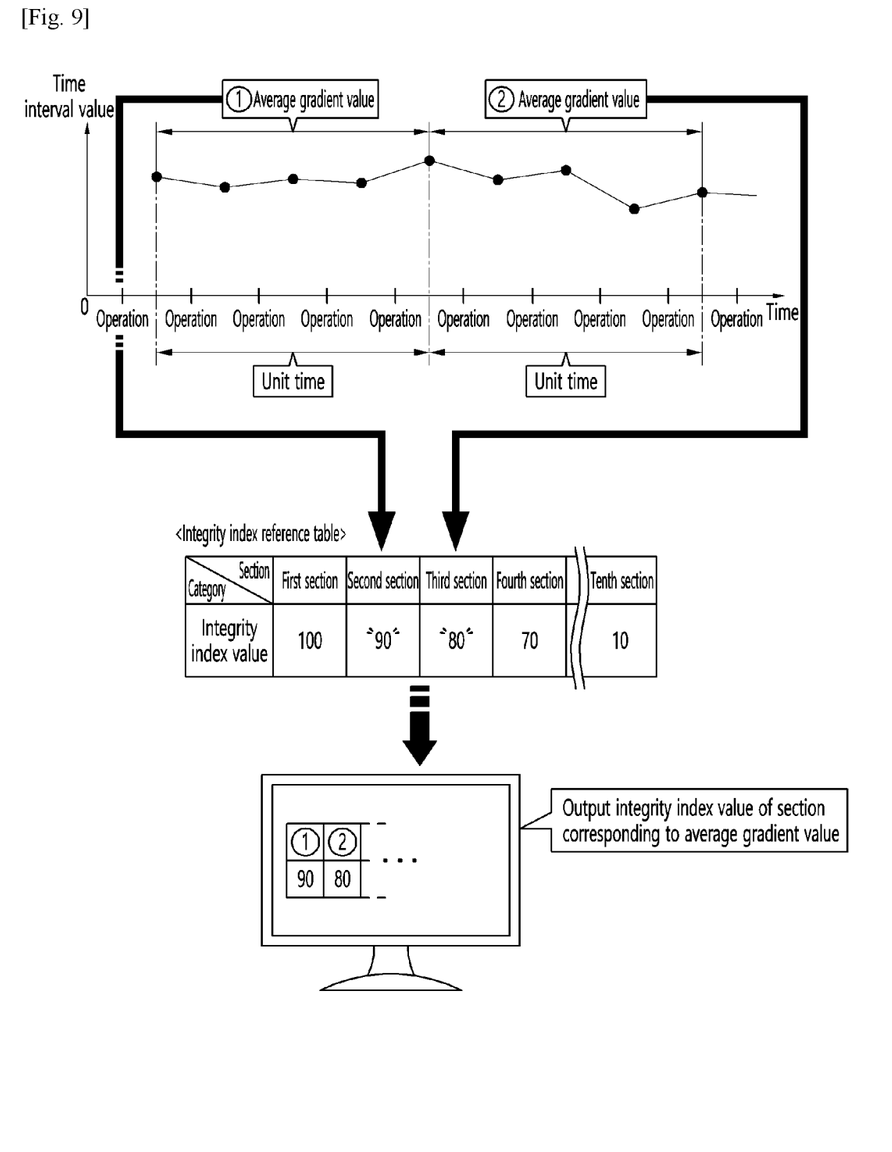
FIG. 9 is a view illustrating a procedure of detecting an integrity index of a device based on a gradient value according to an exemplary embodiment of the present invention.

FIG. 9 is a view illustrating a procedure of detecting an integrity index of a device based on a gradient value according to an exemplary embodiment of the present invention.

Referring to FIG. 9, when in the setting step S30, a section including four gradient values for the time interval value between the control output signals is set with a predetermined unit time, in the detecting step S40, an average gradient value averaged by collecting the gradient values for the time interval values between the output control signals included in the unit time of the device in real time is detected and the detected average gradient value is applied to the integrity index reference table to detect the integrity index value of the device.

Here, the unit time may be set in the setting step S30 to include at least two gradient values and may be set by several seconds as a smaller unit and also set by days, months, or years in consideration of the driving condition or surrounding environments of the device.

The integrity index detecting method 100 for a device by means of a control output signal of the present invention which detects the integrity of the device by the above-described procedure, after establishing an integrity index reference table based on an integrity reference value set based on information collected from a normal device and a defect reference value set based on information collected from a device before a malfunction occurs, outputs an integrity index value indicating an integrity of the device in real time by applying a gradient value with respect to a time interval value between control output signals collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, the integrity index detecting method not only very precisely detects an integrity of the device, but also ensures an excellent reliability for the detected integrity of the device by presenting various detecting conditions for searching for an integrity in the device and detecting the integrity of the device based on the detecting conditions.

Although the integrity index detecting method 100 for a device by means of a control output signal has been described based on the control output signal output from the controller to the device, when the technique is described based on a control input signal which is output from the controller to be input to the device, the same effect may also be expected.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

The exemplary embodiment according to the present invention may be implemented by various means, for example, a hardware, a firmware, a software, and a combination thereof. When the exemplary embodiment is implemented by the hardware, one exemplary embodiment of the present invention may be implemented by one or more of application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

Further, in the case of the implementation by firmware or software, the exemplary embodiment of the present invention may be implemented in the form of a module, a procedure, or a function which performs functions or operations described above to be recorded in a recording medium which is readable by various computer means. The recording medium may include solely a program instruction, a data file, and a data structure or a combination thereof. The program instruction recorded in the recording medium may be specifically designed or constructed for the present disclosure or known to those skilled in the art of a computer software to be used. For example, the recording medium includes a hardware device which is specifically configured to store or execute a program instruction, such as a magnetic media such as a hard disk, a floppy disk, and a magnetic tape, an optical media such as a compact disk read only memory (CD-ROM) or a digital video disk (DVD), a magneto-optical media such as a floptical disk, a ROM, a random access memory (RAM), and a flash memory. Examples of the program instruction include not only a machine language code which is created by a compiler but also a high level language code which may be executed by a computer using an interpreter. The hardware device may operate as one or more software modules in order to perform the operation of the present disclosure and vice versa.

Further, the device or the terminal according to the present invention may be driven by an instruction which causes one or more processors to perform the above-described functions and processes. For example, such an instruction may include interpreted instructions such as script instructions of JavaScript or ECMA script instructions, an executable code, or other instructions stored in a computer readable medium. Moreover, the device according to the present invention may be implemented as a distributed type over a network, such as a server farm, or may be implemented in a single computer device.

A computer program (also known as a program, software, software application, script or code) which is installed in the device according to the present invention and executes the method according to the present invention may be written in any form of a programming language including a compiled or interpreted language or a priori or procedural language. It can be deployed in any form including standalone programs, modules, components, subroutines or other units suitable to be used in a computer environment. The computer program does not necessarily correspond to a file of the file system. The program may be stored in a single file provided to a requested program, in multiple interacting files (for example, a file which stores one or more modules, subprograms, or a part of code), or in a part of a file which holds other programs or data (for example, one or more scripts stored in a markup language document). The computer program is located at one site or distributed over a plurality of sites to be deployed to be executed on multiple computers which are interconnected by a communication network or one computer.

For the convenience of description, even though the drawings have been separately described, exemplary embodiments illustrated in the drawings are designed to be merged to implement a new exemplary embodiment. Further, according to the present invention, the configuration and method of exemplary embodiments as described above may not be applied with limitation, but the exemplary embodiments may be configured by selectively combining all or a part of each embodiment such that various modifications may be made.

Preferred exemplary embodiments of the present invention have been illustrated and described above, but the present invention is not limited to the above-described specific exemplary embodiments, it is obvious that various modifications may be made by those skilled in the art, to which the present invention pertains without departing from the gist of the present invention, which is claimed in the claims, and such modifications should not be individually understood from the technical spirit or prospect of the present invention.

The present invention may be applied to various device inspection technical fields.

The invention claimed is:

1. An integrity index detecting method for a device by using multiple control output signals, with an aid of a digital computer, the method comprising:

providing the digital computer with a data base of time information of the multiple control output signals and operations of the device;

an integrity information collecting step of initially collecting, by the digital computer, a time interval value between a control output signal and another control output signal which are output from a controller in a normal state of the device which receives at least one control output signal output from the controller to repetitively operate in which the time interval value between the control output signal and another control output signal which are output from the controller to allow the device to repeat an operation is repetitively collected and gradient information for the time interval value between the control output signals is collected by means of a gradient of a straight line connecting the collected time interval values;

a defect information collecting step of initially collecting, by the digital computer, a time interval value between a control output signal and another control output signal which are output from the controller in a state before malfunction of the device which receives at least one control output signal output from the controller to repetitively operate occurs, in which the time interval value between the control output signal and another control output signal which are output from the controller to allow the device to repeat the operation is repetitively collected and the gradient information for the time interval value between the control output signals is collected by means of the gradient of the straight line connecting the collected time interval values, wherein the control output signal and another control output signal between which the time interval value is collected at least twice during the integrity and defect information collecting steps are for the same operation of the device;

a setting step of automatically setting, by the digital computer, an integrity reference value and a defect reference value for the gradient of the time interval value between the control output signals based on the gradient information for the time interval value between the control output signals collected in the integrity and defect information collecting steps;

a detecting step of constantly measuring and detecting, by the digital computer, the time interval value between the control output signal and another control output signal which are output from the controller to repetitively perform the operation of the device in real time and automatically detecting, by the digital computer, the integrity index value of the device by automatically comparing the integrity and defect reference values set in the setting step with a gradient value for the collected time interval value; and an outputting step of outputting the integrity index value detected in the detecting step to provide the integrity index value to a manager, wherein in the detecting step, the time interval value is repetitively measured and detected by the digital computer in real time, wherein when the integrity index value of the device is extracted in real time, the extracted integrity index value is output to a normal monitor as an image, and wherein the gradient value corresponds to an absolute value of a difference of timings between the control output signals.

2. The integrity index detecting method of claim 1, wherein the detecting step includes:

a partitioning procedure of partitioning a section between the integrity reference value and the defect reference value for the gradient of the time interval value between the control output signals set in the setting step into at least two sections;

a setting procedure of setting a section partitioned between the integrity reference value and the defect reference value to a first section, a second section, . . . , and an n-th section sequentially from the integrity reference value and establishing the integrity index reference table by setting an integrity index value for each section; and a detecting procedure of applying the gradient value for the time interval value between the control output signals measured and collected in the device in real time to the integrity index reference table to detect a section corresponding to the gradient value for the measured time interval value and extract the integrity index value of the detected section.

3. The integrity index detecting method of claim 2, wherein in the setting step, an average detection section of predetermined unit time intervals including two or more gradient values for the time interval value between the control output signals transmitted to the device is set and in the detecting procedure of the detecting step, the gradient value for the time interval value between the control output signals transmitted to the device during the average detection section in real time is collected to apply the averaged average gradient value to the integrity index reference table to detect the integrity index value of the device.

4. The integrity index detecting method of claim 1, wherein the measured and detected time interval includes a time interval between a $n^{th}$ control output signal and a $(n+m)^{th}$ control output signal, and wherein:

the n is a natural number which is equal or more than one; and the m is a natural number which is equal or more than two.

* * * * *

UNITED STATES PATENT AND TRADEMARK OFFICE
CERTIFICATE OF CORRECTION

| | | |
|---|---|---|
| PATENT NO. | : 11,914,356 B2 | Page 1 of 1 |
| APPLICATION NO. | : 17/558976 | |
| DATED | : February 27, 2024 | |
| INVENTOR(S) | : Young Kyu Lee | |

It is certified that error appears in the above-identified patent and that said Letters Patent is hereby corrected as shown below:

On the Title Page

Column 1, (63):
Continuation of application No. PCT/KR2020/007278, filed on Apr. 6, 2020.

Should read:
Continuation of application No. PCT/KR2020/007278, filed on June 4, 2020.

Signed and Sealed this
Second Day of April, 2024

Katherine Kelly Vidal
*Director of the United States Patent and Trademark Office*